United States Patent
Fujiwara et al.

(10) Patent No.: US 9,296,352 B2
(45) Date of Patent: Mar. 29, 2016

(54) VEHICLE SEAT PROVIDED WITH SIDE AIRBAG DEVICE

(75) Inventors: Yusuke Fujiwara, Okazaki (JP); Osamu Fukawatase, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 61 days.

(21) Appl. No.: 14/234,880

(22) PCT Filed: Jul. 28, 2011

(86) PCT No.: PCT/JP2011/067361
§ 371 (c)(1),
(2), (4) Date: Jan. 24, 2014

(87) PCT Pub. No.: WO2013/014800
PCT Pub. Date: Jan. 31, 2013

(65) Prior Publication Data
US 2014/0183846 A1    Jul. 3, 2014

(51) Int. Cl.
| | |
|---|---|
| *B60R 21/207* | (2006.01) |
| *B60R 21/233* | (2006.01) |
| *B60N 2/58* | (2006.01) |
| *B60N 2/68* | (2006.01) |
| *B60N 2/70* | (2006.01) |
| *B60R 21/217* | (2011.01) |

(52) U.S. Cl.
CPC .......... *B60R 21/207* (2013.01); *B60N 2/5825* (2013.01); *B60N 2/68* (2013.01); *B60N 2/7011* (2013.01); *B60N 2/7094* (2013.01); *B60R 21/2171* (2013.01); *B60R 21/233* (2013.01); *B60N 2002/5808* (2013.01); *B60R 2021/2076* (2013.01)

(58) Field of Classification Search
CPC  B60R 21/207; B60R 21/2171; B60R 21/233; B60R 2021/2076; B60N 2/5825; B60N 2/7011; B60N 2/7094; B60N 2/68; B60N 2002/5808
See application file for complete search history.

(56) References Cited

U.S. PATENT DOCUMENTS

| | | | | |
|---|---|---|---|---|
| 5,799,971 | A | * 9/1998 | Asada | B60R 21/207 280/728.3 |
| 5,845,932 | A | * 12/1998 | Kimura | B60R 21/207 280/728.2 |
| 5,860,673 | A | 1/1999 | Hasegawa et al. | |
| 5,944,341 | A | * 8/1999 | Kimura | B60R 21/207 280/728.3 |
| 5,967,547 | A | * 10/1999 | Narita | B60R 21/207 280/728.2 |
| 5,992,878 | A | * 11/1999 | Narita | B60R 21/207 280/728.2 |
| 6,155,593 | A | * 12/2000 | Kimura | B60R 21/207 280/728.2 |
| 7,350,803 | B2 | * 4/2008 | Abramczyk | B60R 21/207 280/730.2 |
| 8,596,674 | B2 | * 12/2013 | Fukawatase | B60N 2/449 280/728.2 |

(Continued)

FOREIGN PATENT DOCUMENTS

| | | |
|---|---|---|
| JP | A-8-324372 | 12/1996 |
| JP | A-09-132102 | 5/1997 |

(Continued)

*Primary Examiner* — Paul N Dickson
*Assistant Examiner* — Joselynn Y Slitheris
(74) *Attorney, Agent, or Firm* — Oliff PLC

(57) ABSTRACT

A seat back board made from resin is fitted to side frames of a seatback frame from a seat rear side. A seat width direction outer side portion of the seat back board is integrally formed with a case portion that houses a side airbag device that is fixed to an outside face of the side frame. The presence of a side wall portion of the case portion suppresses a side airbag from expanding towards the seatback outside in a ball shape during initial inflation.

5 Claims, 10 Drawing Sheets

(56) References Cited

U.S. PATENT DOCUMENTS

| | | | |
|---|---|---|---|
| 8,807,594 B2* | 8/2014 | Mizobata | B60N 2/6009 280/730.2 |
| 8,814,203 B2* | 8/2014 | Tracht | B60R 21/207 280/728.2 |
| 2006/0163850 A1* | 7/2006 | Inazu | B60N 2/5825 280/730.2 |
| 2014/0070594 A1* | 3/2014 | Awata | B60N 2/5825 297/452.48 |

FOREIGN PATENT DOCUMENTS

| | | |
|---|---|---|
| JP | A-9-309400 | 12/1997 |
| JP | B2-3345279 | 11/2002 |
| JP | A-2010-184668 | 8/2010 |
| JP | A-2010-241192 | 10/2010 |
| JP | A-2011-68197 | 4/2011 |
| JP | A-2011-68198 | 4/2011 |
| JP | A-2011-126497 | 6/2011 |

* cited by examiner

VEHICLE SEAT PROVIDED WITH SIDE AIRBAG DEVICE

TECHNICAL FIELD

The present invention relates to a vehicle seat provided with a side airbag device.

BACKGROUND ART

Patent Document 1 below discloses a vehicle seat provided with a side airbag device that inflates and deploys a side airbag between door trim of a side door and the side of a seated occupant in the event of a side-on collision. In this related technology, a bracket is provided that covers a portion of the side airbag from the vehicle rear side and that is open towards the front side. Configuration is made with a structure in which the bracket is fixed to a seatback side frame at a seat width direction outer side, and a seat back board is fixed to the seatback side frame through the bracket. In side view of the seat, a front end portion of an airbag case is positioned further towards the vehicle front side than the seat back board and a front end portion of the bracket. In this configuration, the seat back board is fixed to the seatback side frame through the bracket, preventing the seatback board from impeding deployment of the side airbag. The bracket also functions to guide deployment of the side airbag towards the vehicle front side. Deployment characteristics of the side airbag are thereby improved, enabling swift deployment of the side airbag towards the vehicle front side.

Patent Document 1: Japanese Patent Application Laid-Open (JP-A) No. 2010-184668
Patent Document 2: Japanese Patent No. 3345279
Patent Document 3: JP-A No. H09-309400
Patent Document 4: JP-A No. H08-324372
Patent Document 5: JP-A No. 2010-241192
Patent Document 6: JP-A No. 2011-068197

DISCLOSURE OF INVENTION

Technical Problem

However, the related technology described above has an increased number of components due to requiring the bracket that is a component unrelated to a side airbag device in itself. Assembly operations to the seatback side frame, including those of the side airbag device and the seat back board, become more complex due to providing the bracket. This increase in the number of components and in the complexity of assembly processes moreover entails an increase in costs.

In consideration of the above circumstances, an object of the present invention is to obtain a vehicle seat provided with a side airbag device capable of improving initial occupant restraint performance of a side airbag, and also achieving a reduction in costs.

Solution to Problem

A vehicle seat provided with a side airbag device of a first aspect of the present invention includes: a seatback frame that is provided with a pair of left and right side frames and that configures a seatback framework member; a side airbag device that is installed at a seat width direction outer side of the one of the side frames disposed facing a vehicle body side portion, and that inflates and deploys a side airbag towards a seat front side in the event of a side-on collision; a seat back board made from resin, that is disposed at a seatback back face side and that is fixed to the pair of left and right side frames; a seatback pad that is disposed at a front face side of the seat back board, with a seat width direction outer side portion of the seatback pad disposed at the seat width direction outer side of the side airbag device; and an upright wall portion that is integral to, or is integrally provided to, a seat width direction outer side portion of the seat back board, and that extends in a seat front-rear direction and a seat up-down direction along a seat width direction outer side face of the side airbag that is in a folded state inside a side portion of the seatback pad, the upright wall portion restricting expansion of the side airbag towards the seat width direction outer side.

A vehicle seat provided with a side airbag device of a second aspect is the first aspect, wherein: the upright wall portion is integrally formed to the seat back board, and doubles as an airbag case that at least houses the side airbag in a folded state.

A vehicle seat provided with a side airbag device of a third aspect is either the first aspect or the second aspect, wherein: the side airbag device is fixed at a seat width direction outer side of the seatback side frame; and the seat back board is assembled from a seatback frame rear side so as to cover the side airbag device from the seat rear side, and is fixed to the pair of left and right seatback side frames.

A vehicle seat provided with a side airbag device of a fourth aspect is either the first aspect or the second aspect, wherein: the seat back board is fitted together with the seatback frame from the seat front side and fixed to the pair of left and right seatback side frames, and a case portion configured with a U-shape open towards the seat front side in plan view cross-section is provided at a seat width direction outer side end portion of the seat back board; and the side airbag device is fixed to a rear wall portion of the case.

A vehicle seat provided with a side airbag device of a fifth aspect is any one of the second aspect to the fourth aspect, wherein: a bottom wall portion that is integrally formed to the seat back board and that extends in a direction intersecting with the upright wall portion is connected to a lower end portion of the upright wall portion.

A vehicle seat provided with a side airbag device of a sixth aspect is the fifth aspect, wherein: the side airbag device is configured including an inflake that is formed with a circular cylinder shape and that is provided with a gas ejection portion, at a lower end portion thereof the gas ejection portion supplying gas into the side airbag that is in a folded state; and the side airbag device is installed in a range from a height direction intermediate portion to a lower end portion of a seat width direction outer side portion of the seatback.

A vehicle seat provided with a side airbag device of a seventh aspect is any one of the first aspect to the sixth aspect, wherein: the inside of the side airbag is provided with a partitioning wall, thereby partitioning the side airbag into a lower chamber that is disposed facing the gas ejection portion along the seat front-rear direction and that restrains a waist of a seated occupant, and an upper chamber that restrains a chest of the seated occupant.

According to the first aspect, in the event of a side-on collision, the side airbag of the side airbag device is inflated and deployed towards the seat front side. When this occurs, the side airbag attempts to expand whilst pushing a side portion of the seatback pad out towards the seat width direction outer side, by the amount by which the side airbag is unable to expand towards the seatback side frame side.

In the present aspect, the upright wall portion is integral to, or is integrally provided to, the seat width direction outer side portion of the seat back board, and extends in the seat front-rear direction and the seat up-down direction along the seat width direction outer side face of the side airbag that is in a folded state inside the side portion of the seatback pad. The rigidity of the upright wall portion thereby restricts the side airbag from expanding towards the seat width direction outer side. The side airbag is thereby effectively suppressed from expanding in a ball shape whilst crushing a side portion of the seatback pad. The side airbag is swiftly inflated and deployed towards the seat front side in the event of a side-on collision as a result.

Moreover, due to the upright wall portion being integral to, or integrally provided to, the seat back board, there is no increase in the number of components, and the assembly process does not become more complex.

According to the second aspect, a separately formed airbag case can be omitted since the upright wall portion doubles as an airbag case that at least houses the side airbag.

According to the third aspect, the side airbag device is fixed at a seat width direction outer side of the seatback side frame. In the present aspect, the seat back board is assembled from the rear side of the seatback frame and fixed to the pair of left and right seatback side frames so as to cover the side airbag device from the seat rear side once this operation has been completed.

According to the fourth aspect, the case portion that is configured with a U-shape open towards the seat front side in plan view cross-section is provided to the seat width direction outer side end portion of the seat back board, and the side airbag device is assembled to the case portion in advance. Next, the seat back board is fitted together with the seatback frame from the seat front side, and the seat back board is fixed to the pair of left and right seatback side frames.

During inflation and deployment of the side airbag towards the vehicle front side, a reaction force acts towards the seat rear side (namely in the direction in which the seat back board fits together most strongly with the seatback side frame).

According to the fifth aspect, the bottom wall portion that is integrally formed to the seat back and that extends in a direction intersecting with the upright wall portion is connected to the lower end portion of the upright wall portion such that the lower end portion of the upright wall portion is reinforced by the bottom wall portion. The resistance of the upright wall portion to deformation when pressure is exerted on the upright wall portion during deployment of the side airbag is therefore increased. The side airbag is thereby even more effectively suppressed from expanding towards the seat width direction outer side during side airbag deployment.

According to the sixth aspect, the bottom wall portion is provided at the lower end portion of the upright wall portion, thereby preventing the side airbag from expanding downwards further than the bottom wall portion during deployment of the side airbag. It is therefore not necessary use the seatback pad to fill up a space below the bottom wall portion. As a result, according to the present aspect it is possible for the overall side airbag device to be installed in a range from a height direction intermediate portion to a lower end portion of the seat width direction outer side portion of the seatback. Installing the side airbag device within this range reduces the distance between the gas ejection portion of the inflator and the waist of the seated occupant compared to when the side airbag device is installed to the seat upper side of this range.

According to the seventh aspect, the partitioning wall provided inside the side airbag partitions the inside of the side airbag into the lower chamber that restrains the waist of the seated occupant and the upper chamber that restrains the chest of the seated occupant. The lower chamber can be inflated and deployed even more swiftly due to the lower chamber being disposed facing the gas ejection portion of the inflator along the seat front-rear direction.

Advantageous Effects of Invention

As described above, the vehicle seat provided with a side airbag device of the first aspect obtains the excellent advantageous effects of enabling initial occupant restraint performance of the side airbag to be improved, and also achieving a reduction in costs.

The vehicle seat provided with a side airbag device of the second aspect obtains the excellent advantageous effect of enabling a reduction in the number of components, and thereby a reduction in costs, compared to when a separate airbag case is provided.

The vehicle seat provided with a side airbag device of the third aspect obtains the excellent advantageous effect of enabling a side airbag device to be installed without modifying an existing assembly sequence of a vehicle seat provided with a seat back board.

The vehicle seat provided with a side airbag device of the fourth aspect obtains the excellent advantageous effect of enabling the seat back board to be prevented from coming away from the seatback side frames during deployment of the side airbag.

The vehicle seat provided with a side airbag device of the fifth aspect obtains the excellent advantageous effect of enabling swifter deployment of the side airbag between the vehicle body side portion and the side of the seated occupant in the event of a side-on collision.

The vehicle seat provided with a side airbag device of the sixth aspect obtains the excellent advantageous effect of enabling an increase in the degrees of freedom in the layout of the side airbag device with respect to the seatback, as well as enabling further improvement in the initial restraint performance of the waist of a seated occupant.

The vehicle seat provided with a side airbag device of the seventh aspect obtains the excellent advantageous effect of enabling a significant improvement in the initial restraint performance of the waist of the seated occupant.

BEST MODE FOR CARRYING OUT THE INVENTION

First Exemplary Embodiment

Figure 1:
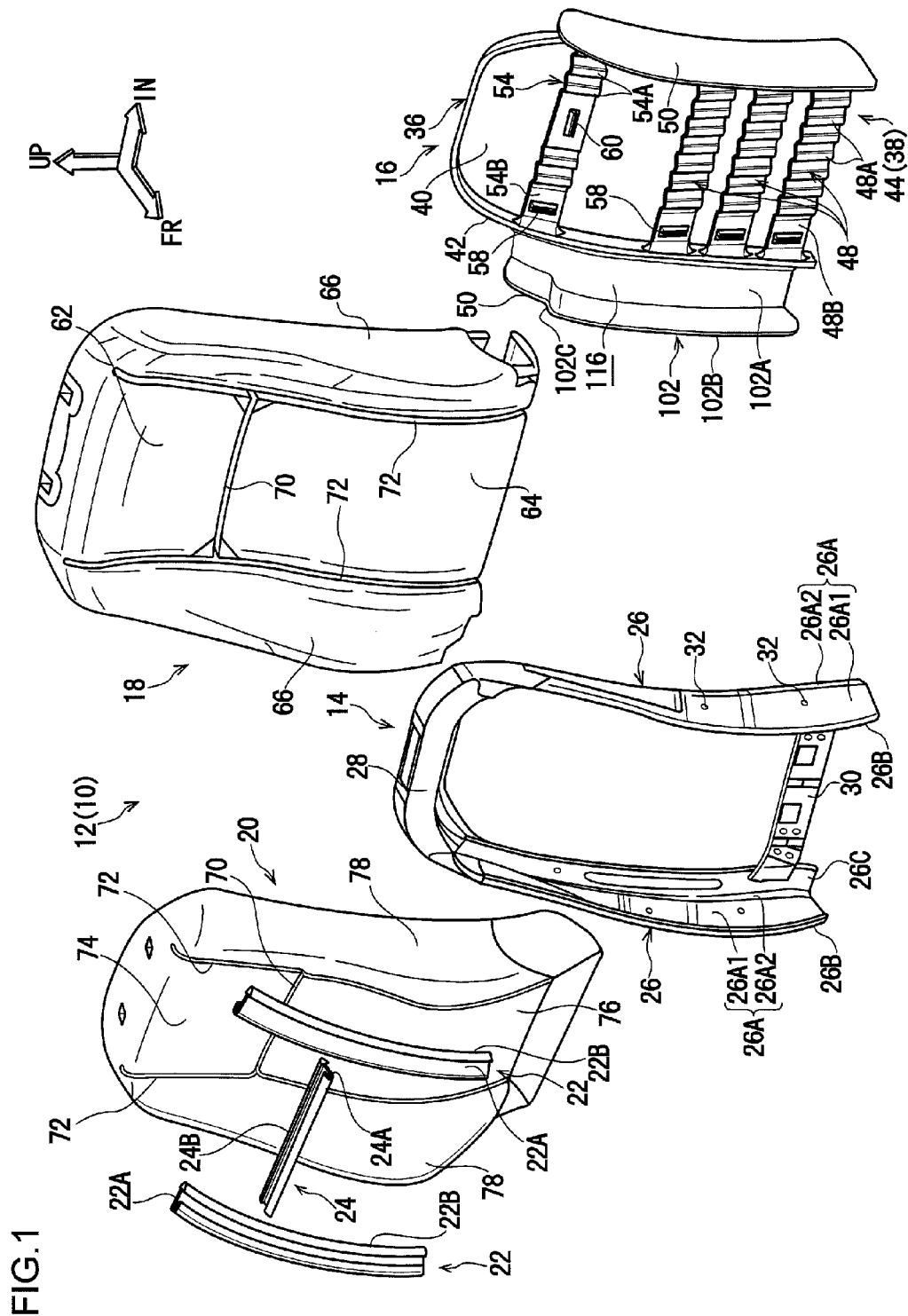
FIG. 1 is an exploded perspective view illustrating a seatback of a vehicle seat provided with a side airbag device according to a first exemplary embodiment.

Explanation follows regarding a first exemplary embodiment of a vehicle seat provided with a side airbag device according to the present invention, with reference to FIG. 1 to FIG. 7. Note that in the drawings, the arrow FR indicates the vehicle front side, the arrow UP indicates the vehicle upper side, and the arrow IN indicates the vehicle width direction inside as appropriate.

Overall Configuration

As illustrated in FIG. 1 to FIG. 4, a vehicle seat 10 is configured by a seat cushion 11 (see FIG. 4) on which an occupant sits, a seatback 12 that is reclinably supported at a rear end portion of the seat cushion 11, and a headrest 13 (see FIG. 7) that is supported at an upper end portion of the seatback 12 so as to be capable of moving up and down. Note that a side airbag device 100 is omitted from illustration in FIG. 1 and FIG. 2.

As illustrated in FIG. 1, the seatback 12 is configured by a metal seatback frame 14 configuring a framework member of the seatback 12, a resin spring integral seat back board (referred to below simply as "seat back board") 16 that is mounted to the seatback frame 14 from the seat rear side, a seatback pad 18 that configures a cushion member of the seatback 12, is attached from a front face side of the seatback board 16 and is supported by the seatback frame 14, a cover (skin) 20 that covers mainly the front face of the seatback pad 18, and vertical direction attachment members 22 and a horizontal direction attachment member 24 for attaching the cover 20 to the seatback board 16. Detailed explanation follows regarding each configuration element.

Seatback Frame 14 Configuration

The seatback frame 14 is formed in a rectangular frame shape as viewed from the front (meaning as viewed from the front of the vehicle. In the following explanation, the orientation of the vehicle seat 10 corresponds to the orientation of the vehicle). Specifically, the seatback frame 14 is configured from a pair of left and right side frames 26 disposed facing each other across the seat width direction, an inverted U-shaped upper frame 28 that connects together upper end portions of the left and right side frames 26, and a lower frame 30 that connects together lower end portions of the left and right side frames 26 across the vehicle width direction. The seatback frame 14 is manufactured by press forming the four members including the upper frame 28, however other frame structures may be adopted. For example, the upper frame alone may be configured from a pipe member bent into an inverted U-shape, or the upper frame and the pair of left and right side frames may be configured from a single pipe member bent into an inverted U-shape as viewed from the front.

Figure 2:
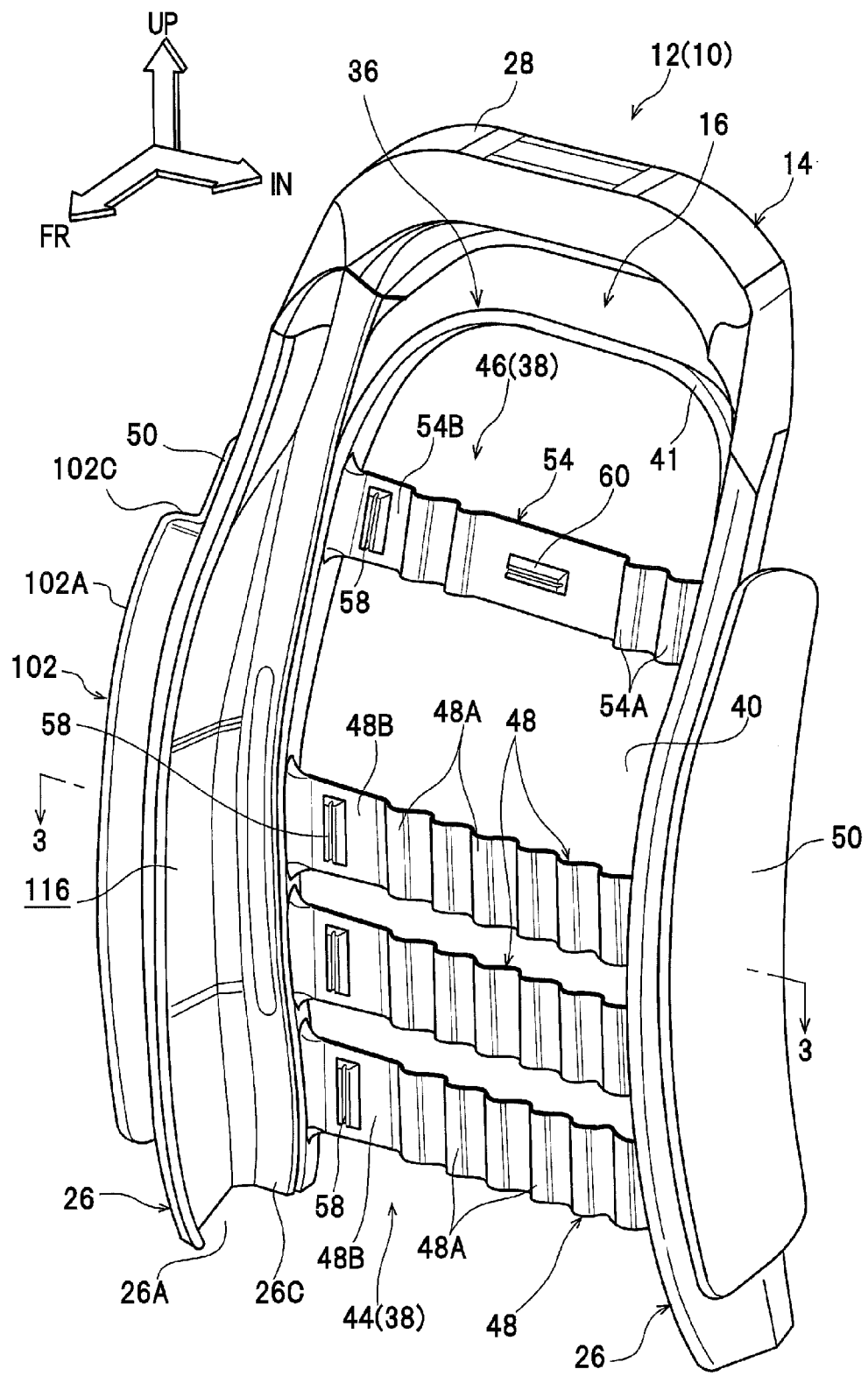
FIG. 2 is an enlarged perspective view illustrating an assembled state of a resin spring integral seat back board to the seatback frame illustrated in FIG. 1.
Figure 3:
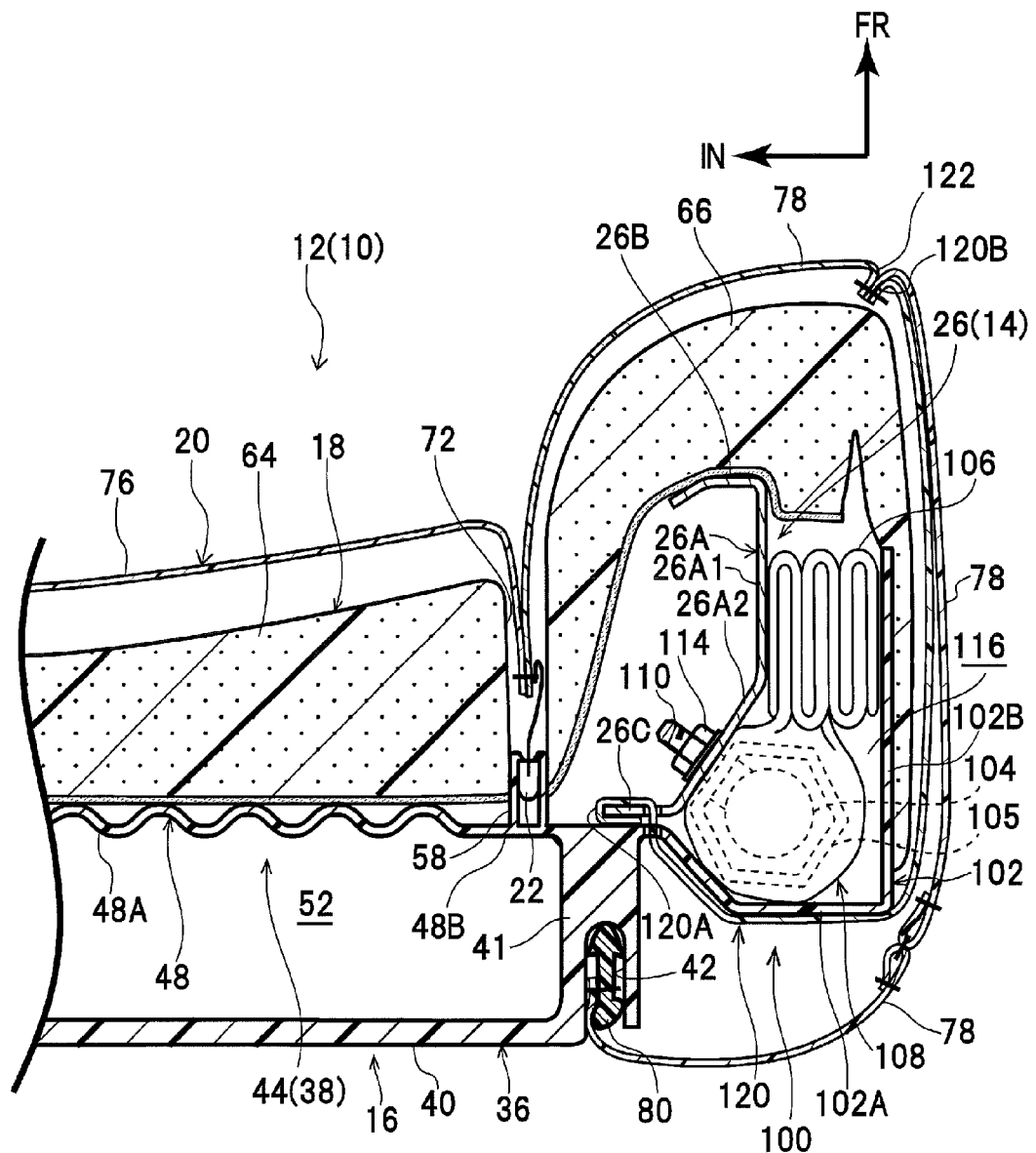
FIG. 3 is an enlarged plan view cross-section (a cross-section taken along line 3-3 in FIG. 2) illustrating an assembled state of the seatback illustrated in FIG. 1.

Explanation follows regarding the cross-section structure of the left and right side frames 26. As illustrated in FIG. 1 to FIG. 3, the side frames 26 are respectively configured by a side wall portion 26A, a front wall portion 26B and a rear wall portion 26C. Viewed in isolation in plan view cross-section, the side frames 26 are configured with substantially C-shaped profiles, and viewed as a left and right pair in plan view cross-section, the side frames 26 are formed with open cross-section profiles that are open towards the inside facing each other along the seat width direction. Viewed in plan view cross-section, the side wall portions 26A of the side frames 26 are respectively configured by a front portion 26A1 that extends along the vehicle front-rear direction, and a rear portion 26A2 that is bent diagonally towards the vehicle width direction inside from a rear end portion of the front portion 26A1. The side wall portion 26A is configured overall so as to narrow in width (seat front-rear direction length) on progression from a lower end portion towards an upper end portion as viewed from the side. The side wall portion 26A is formed with plural attachment holes 32 (see FIG. 1) at a top to bottom separation for attaching the seat back board 16, described later. The front wall portion 26B has a vertical-running bend towards the seat width direction inner side from a front edge of the side wall portion 26A, and is bent somewhat towards the diagonal rear at an inner edge portion. The rear wall portion 26C is bent towards the seat width direction inner side from a rear end of the rear portion 26A2 of the side wall portion 26A. Note that the cross-section profile of the side frames 26 described above is merely one example thereof. Side frames with other cross-section profiles may also be employed.

Seat Back Board 16 Configuration

Detailed explanation follows regarding the overall configuration of the seat back board 16 configuring a relevant portion of the vehicle seat 10. As illustrated in FIG. 1 to FIG. 4 (in particular in FIG. 1 to FIG. 3), the seat back board 16 includes a back board portion 36 that is formed in a plate shape and is disposed at a back face side of the seatback frame 14, and a back spring section 38 that is disposed at a front face side of and at a separation to the back board portion 36, and that undergoes resilient deformation in the load application direction when load acts towards the seat rear side. The seat back board 16 is configured from a resin material.

The back board portion 36 is configured by a board main body 40 that is formed slightly smaller than the seatback frame 14, and a peripheral wall portion 41 of a specific height that projects out at an outer local portion of the board main body 40. As illustrated in FIG. 3, a rear end portion of the peripheral wall portion 41 is formed with an anchor groove 42. Anchor tabs 80 sewn to a rear end side terminal portion of a cover side portion 78, described later, are anchored in the anchor groove 42.

The back spring section 38 is configured from a lower side back spring portion 44 disposed at a lower portion side of the back board portion 36, and an upper side back spring portion 46 disposed at an upper portion side of the back board portion 36. The upper side back spring portion 46 is disposed at a position separated from the lower side back spring portion 44 by a specific separation distance in the seatback height direction.

The lower side back spring portion 44 includes 3 lower side back spring body portions 48 disposed in three top-to-bottom parallel tiers along the seatback height direction, and supports the waist of a seated occupant. Note that the number of the lower side back spring body portions 48 configuring the lower side back spring portions 44 may be set as desired, and varied as appropriate based on a relationship with the required cushioning properties. Configuration may accordingly be made with a single lower side back spring body portion with an increased top-to-bottom width, or configuration may be made with two, or four or more, plural lower side back spring body portions.

The lower side back spring body portions 48 are formed with a wave shaped cross-section profile in plan view, and are configured such that wave shaped portions 48A stretch when load acts towards the back board portion 36 side (the seat rear side), thereby undergoing flexing deformation (resilient deformation) towards the back board portion 36 side that is the load application direction. Note that vertical resin clip portions 58, described later, for attaching the cover 20 are integrally formed in the vicinity of both length direction end portions 48B lower side back spring body portions 48 (see FIG. 2). The wave shaped portions 48A are not formed within a range in which the vertical resin clip portions 58 are formed.

As illustrated in FIG. 3, the back board portion 36 is disposed at a position separated from the lower side back spring portion 44 by a specific separation distance towards the vehicle rear side. Namely, a specific gap 52 is formed between the lower side back spring portion 44 and the back board portion 36. The lower side back spring body portions 48 are capable of undergoing resilient deformation within the range of the gap 52. Namely the back board portion 36 also functions as a limiting member that limits deflection of the lower side back spring portion 44 to a specific amount or below.

The upper side back spring portion 46 has the same basic configuration as the lower side back spring portion 44. Namely, an upper side back spring body portion 54 is formed with wave shaped portions 54A that stretch and undergo flexing deformation (resilient deformation) when load acts towards the back board portion 36 side (the seat rear side). Both length direction end portions 54B of the upper side back spring body portion 54 (see FIG. 2) are integrally formed with vertical resin clip portions 58, and horizontal resin clip portions 60 are integrally formed at both length direction end portions 54B and at a central portion.

In the present exemplary embodiment, the upper side back spring portion 46 is configured by a single tier (one individual), however there is no limitation thereto, and configuration may be made with plural tiers (plural individuals), or configuration may be made wherein a back spring portion is provided with plural tiers (plural individuals) spanning from an upper portion to a lower portion of the back board portion 36 at even intervals.

Both length direction end portions 48B of the lower side back spring body portions 48 and both length direction end portions 54B of the upper side back spring body portion 54 are connected to inside faces of front edge portions of the peripheral wall portion 41 of the back board portion 36.

As illustrated in FIG. 1 to FIG. 3 (in particular in FIG. 3), both side portions of the back board portion 36 described above are integrally formed with a pair of left and right fixing portions 50. The pair of left and right fixing portions 50 are disposed at the seat width direction outer sides of the side wall portions 26A of the left and right side frames 26. The seat back board 16 is accordingly configured so as to be capable of fitting together with the seatback frame 14 from the seat rear side. Resin clips, not illustrated in the drawings, project out from seat width direction inner side faces of the left and right fixing portions 50, with these resin clips inserted into the attachment holes 32 (see FIG. 1) formed in the side wall portions 26A of the side frames 26. The seat back board 16 is thereby fixed to the left and right side frames 26 of the seatback frame 14. Note that fixing members that fix the seat back frame 16 to the side frames 26 do not necessarily need to be resin clips, and various configurations may be adopted, such as a configuration using fasteners such as rivets and screws, or screws or bolts and weld nuts to perform fastening, or a configuration in which adhesion is performed using a structural adhesive.

Seatback Pad 18 Configuration

As illustrated in FIG. 1, the seatback pad 18 is broadly speaking configured by a pad central upper portion 62, a pad central lower portion 64, and a pair of left and right pad side portions 66. Note that the seatback pad 18 is manufactured from, for example, a urethane foam.

Figure 4:
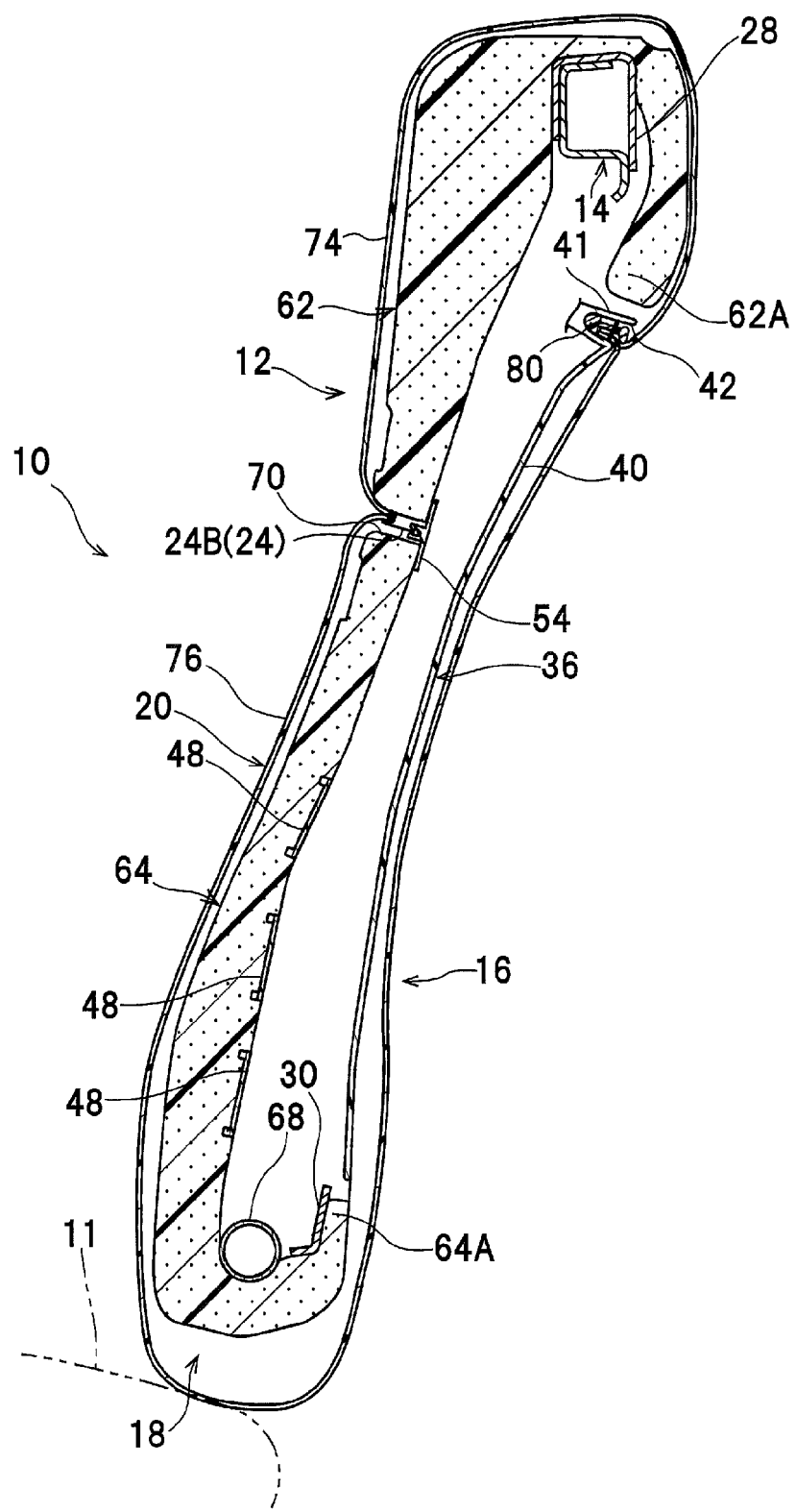
FIG. 4 is an enlarged vertical cross-section illustrating an assembled state of the seatback illustrated in FIG. 1.

As illustrated in FIG. 4, the vertical cross-section profile of the pad central upper portion 62 is formed substantially in a top-bottom and left-right inverted J-shape. The pad central upper portion 62 is anchored to the upper frame 28 of the seatback frame 14 from the seatback upper side. The vertical cross-section profile of the pad central lower portion 64 is formed substantially in a left-right inverted J-shape. The pad central lower portion 64 has a curved projecting profile bulging out further towards the vehicle front side at a lower portion than at an upper portion. The pad central lower portion 64 is anchored from a seatback lower side to a connecting rod 68 that couples together lower end portions of the side frames 26 along the seat width direction. Note that the connecting rod 68 is disposed parallel to the front side of the lower frame 30 of the seatback frame 14.

The pad side portions 66 are respectively formed with substantially C-shaped horizontal cross-section profiles. The pad side portions 66 are mounted to the side frames 26 so as to wrap around the side frames 26 from the seat width direction outer side in a mounted state of the fixing portions 50 to the side frames 26. Note that the pad side portions 66 are formed with a curved projecting profile bulging out further towards the vehicle front side at a lower portion than at an upper portion, with the pad side portions 66 bulging out further towards the vehicle front side than the pad central upper portion 62 and the pad central lower portion 64 in a shape that secures side support characteristics with respect to an occupant. The pad side portion 66 disposed on the seat width direction outer side is configured with a thinner thickness due to installation of the side airbag device 100, described later (see FIG. 3). The seat back board 16 described above is disposed spanning from a back face side lower end portion 62A of the pad central upper portion 62 to a back face side upper end portion 64A of the pad central lower portion 64 as viewed in vertical cross-section.

As illustrated in FIG. 1, a horizontal direction slit 70 for tucking in the cover is formed between the pad central upper portion 62 and the pad central lower portion 64 described above. A pair of left and right vertical direction slits 72 for tucking in the cover are respectively formed between the pad central upper portion 62, the pad central lower portion 64 and the pad side portions 66. The widths of the horizontal direction slit 70 and the vertical direction slits 72 are set at lengths that allow insertion of the vertical direction attachment members 22 and the horizontal direction attachment member 24, described later. The horizontal direction slit 70 and the vertical direction slits 72 are each formed with a linear profile, and respectively penetrate the seatback pad 18 in the seatback pad 18 thickness direction (corresponding to the seat front-rear direction).

Cover 20 and Cover 20 Attachment Structure

As illustrated in FIG. 1, the cover 20 is formed with a size that can cover the seatback pad 18 from the front face side. The cover 20 is provided with a cover central upper portion 74, a cover central lower portion 76, and a pair of left and right cover side portions 78, these corresponding to the split configuration of the seatback pad 18.

The cover 20 is attached to the seat back board 16 by the vertical direction attachment members 22, the horizontal direction attachment member 24, the vertical resin clip portions 58, the horizontal resin clip portions 60 and the outer peripheral anchor portions 80.

The vertical direction attachment members 22 are respectively configured by a strap shaped attachment member body 22A and a substantially wedge shaped resin engagement portion 22B provided at one side edge of the attachment member body 22A. The attachment member bodies 22A are configured as members with a similar softness to the cover 20, with overall length set at a length capable of spanning between the vertical resin clip portions 58 formed to the upper side back spring body portion 54 and the vertical resin clip portions 58 formed to one or to two or more of the lower side back spring body portions 48. The other side edge of the attachment member body 22A is embedded in a central portion of the engagement portion 22B by insert molding. The attachment member body 22A and the engagement portion 22B are thereby integrated together. The other side edges of the attachment member bodies 22A are attached in advance to the cover central upper portion 74, the cover central lower portion 76, and the cover side portions 78 by stitching. Note that although in FIG. 1 the vertical direction attachment members 22 (and the horizontal direction attachment member 24) are depicted as being separate from the cover 20, the vertical direction attachment members 22 (and the horizontal direction attachment member 24) are attached in advance to the back face side of the cover 20.

After insertion through the vertical direction slits 70 of the seatback pad 18, the vertical direction attachment members 22 described above resiliently engage with the vertical resin clip portions 58 of the back spring section 38. The vertical resin clip portions 58 are integrally formed at both length direction end portions 48B of the lower side back spring body portions 48 and at both length direction end portions 54B of the upper side back spring body portion 54. The vertical resin clip portions 58 are each formed in a long narrow projection shape with length direction in the seatback height direction. The engagement portions 22B of the vertical direction attachment members 22 are resiliently engaged with the vertical resin clip portions 58 of the back spring section 38 in sequence from the top or in sequence from the bottom, to give a configuration in which boundary portions between the cover central upper portion 74, the cover central lower portion 76 and the cover side portions 78 are pulled into and anchored to the seat back board 16.

As illustrated in FIG. 1 and FIG. 4, the horizontal direction attachment member 24 differs from the vertical direction attachment members 22 that are disposed with length direction in the seatback height direction in the respect that it is disposed with length direction along the seat width direction, but is otherwise configured similarly to the vertical direction attachment members 22. Namely, similarly to the vertical direction attachment members 22, the horizontal direction attachment member 24 is configured by a strap shaped attachment member body 24A and a substantially wedge shaped resin engagement portion 24B provided at one side edge of the attachment member body 24A. The other side edge of the attachment member body 24A is attached in advance to the cover central upper portion 74 and the cover central lower portion 76 by stitching. The horizontal resin clip portions 60 are configured similarly to the vertical resin clip portions 58. As illustrated in FIG. 4, after the horizontal direction attachment member 24 has been inserted into the horizontal direction slit 70 of the seatback pad 18, the engagement portion 24B is sequentially resiliently engaged with the horizontal resin clip portions 60 of the back spring section 38, to give a configuration in which a boundary portion between the cover central upper portion 74 and the cover central lower portion 76 is pulled into and anchored to the seat back board 16 side. Namely, the horizontal direction attachment member 24 is pulled into the cover 20 at 90 degrees to the vertical direction attachment members 22.

Moreover, as illustrated in FIG. 3 and FIG. 4, the outer peripheral anchor portions 80 are each configured with an arrowhead shaped leading end portion and are attached to outer local portions of the cover 20 at appropriate positions for example by stitching. The outer peripheral anchor portions 80 are inserted deep inside the anchor grooves 42 of the back board portion 36, thereby anchoring the outer local portions of the cover 20 to the back board portion 36.

Side Airbag Device 100 Case Portion 102 Structure

Detailed explanation follows regarding the structure of a case portion 102 of the side airbag device 100 that is a relevant portion of the present exemplary embodiment, with reference to FIG. 1 to FIG. 3 and FIG. 5.

Figure 7:
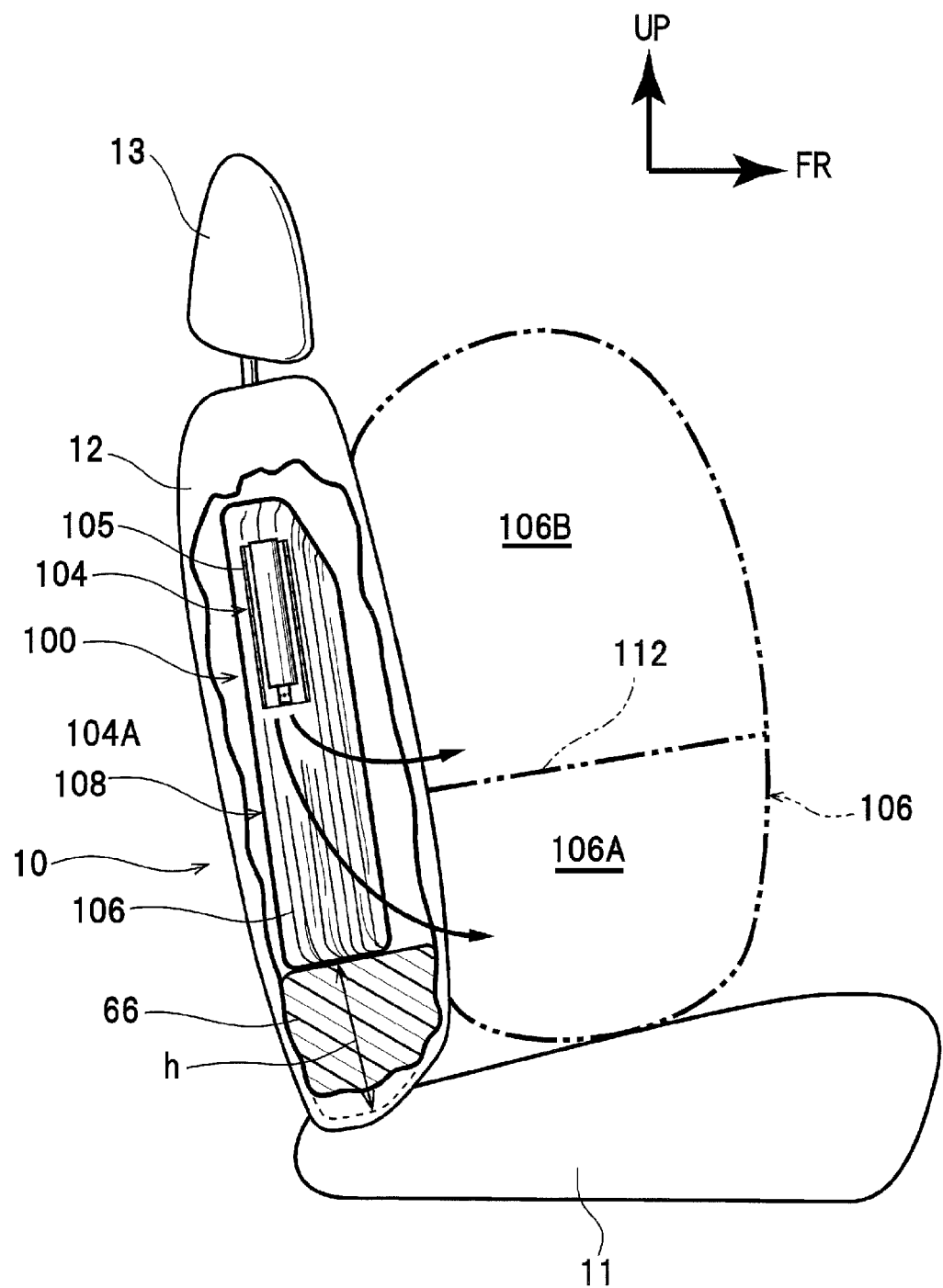
FIG. 7 is a partially cut-away side view illustrating the seatback of the vehicle seat illustrated in FIG. 1.

Brief explanation will first be given regarding the structure of the side airbag device 100. As illustrated in FIG. 3 and FIG. 7, the side airbag device 100 is provided with an airbag module 108 configured including an inflator 104 that actuates and generates gas in event of a side-on collision, a cylinder shaped diffuser 105 disposed surrounding the inflator 104, and a side airbag 106 that is folded up so as to cover the inflator 104 and the diffuser 105.

The inflator 104 is formed in a circular cylinder shape and is closed off at both end portions. A connector that passes a current through a squib (ignition device), not illustrated in the drawings, is connected to an axial center portion of an axial direction upper end portion of the inflator 104. A gas ejection portion 104A formed with plural gas ejection holes projects out coaxially from an axial direction lower end portion of the inflator 104. Functional components including an ignition agent, a combustion transmission agent, a gas generation agent, a coolant and a filter are disposed inside the inflator 104. The gas generation agent combusts when a current is passed through the squib, generating a large quantity of gas. Note that an inflake type with gas sealed at high pressure may be employed instead of an inflake type with sealed gas generation agent.

The inflake 104 is inserted inside the diffuser 105 that is made from metal and is formed in a polygonal shape. The diffuser 105 is integrated with the inflator 104 by crimping an outer peripheral portion of the diffuser 105 towards the radial direction inside in an inserted state of the inflator 104 inside the diffuser 105. The flow of the gas ejected from the plural gas ejection holes of the gas ejection portion 104A of the inflator 104 is thereby regulated by the diffuser 105. A pair of upper and lower stud bolts 110 (see FIG. 3) project out from an outer local portion of the diffuser 105.

As illustrated in FIG. 7, a partitioning wall 112 that divides the side airbag 106 into two chambers in the height direction is provided inside the side airbag 106. The partitioning wall 112 configures the side airbag 106 with a lower chamber 106A that is provided below the partitioning wall 112 and restrains the waist portion of a seated occupant, and an upper chamber 106B that is provided above the partitioning wall 112 and restrains a chest portion of the seated occupant. Note that the partitioning wall 112 is formed with a communication hole, not illustrated in the drawings, that places the upper chamber 106B in communication with the lower chamber 106A.

The airbag module 108 that includes the inflator 104, the diffuser 105 and the side airbag 106 is fixed to the side frame 26 disposed on the seat width direction outer side. Specifically, the pair of stud bolts 110 formed to the diffuser 105 are inserted through a pair of bolt insertion holes formed to the rear portion 26A2 of the side wall portion 26A of the side frame 26, and nuts 114 are screwed onto the stud bolts 110, thereby fixing the side airbag device 100 to the side frame 26.

Figure 5:
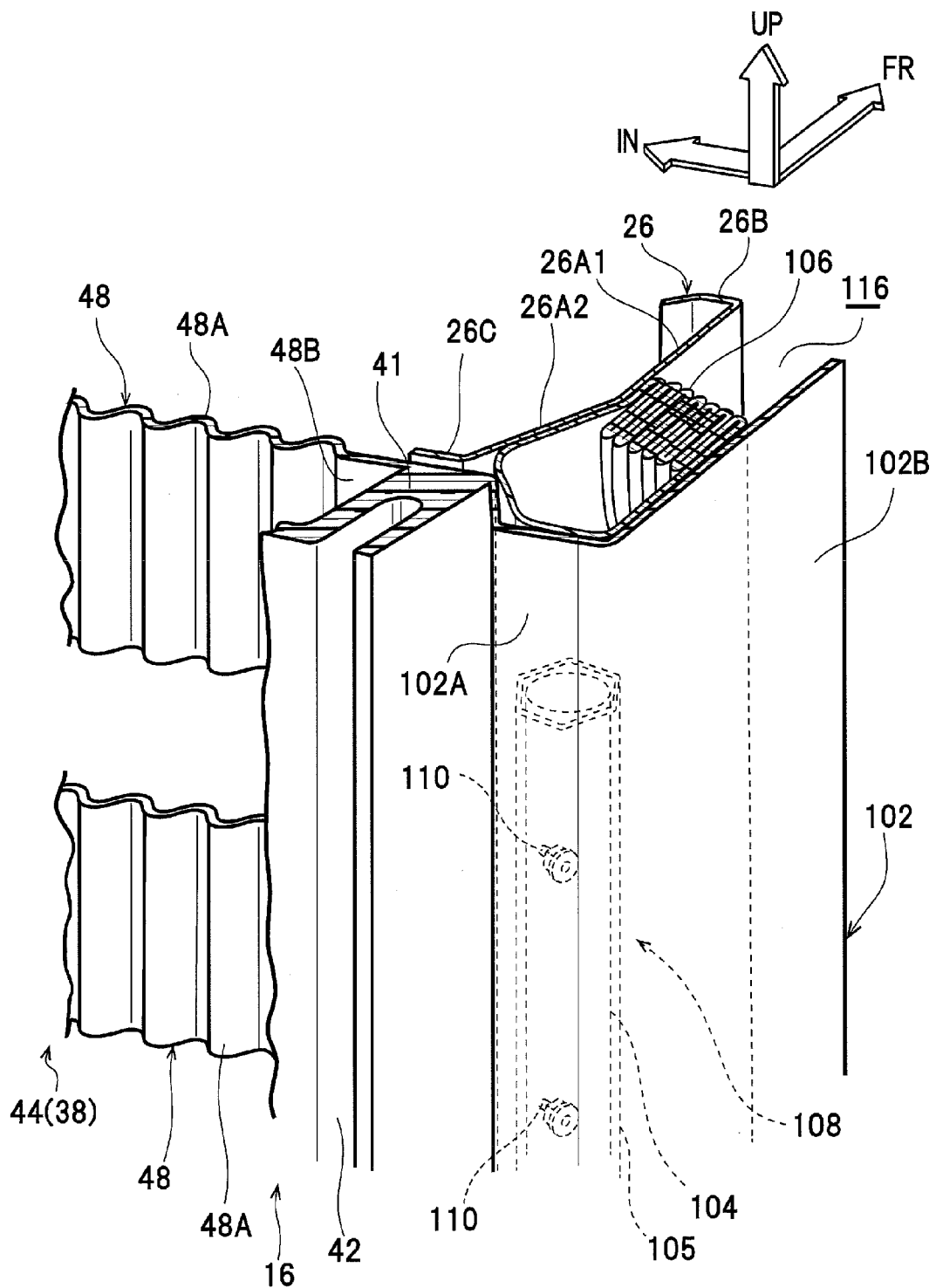
FIG. 5 is an enlarged perspective view illustrating the vicinity of a case portion of the seat back board illustrated in FIG. 3, as viewed from the seat rear side.

Note that as illustrated in FIG. 1 to FIG. 3 and in FIG. 5, the case portion 102 is integrally formed running along the seat height direction at a seat width direction outer side side portion of the seat back board 16. Specifically, the case portion 102 is configured in an L-shape in as seen in plan view, and includes a rear wall portion 102A that juts out from the peripheral wall portion 41 towards the seat width direction outer side, a side wall portion 102B that serves as an upright wall portion and that is bent towards the seat front side from an outside end portion of the rear wall portion 102A, and a top wall portion 102C (see FIG. 2) that connects together an upper end portion of the rear wall portion 102A and an upper end portion of the side wall portion 102B. As illustrated in FIG. 2, the top wall portion 102C is integrally formed from a lower end portion of the fixing portion 50 disposed at the seat width direction outer side of the seat back board 16.

In an assembled state of the seat back board 16, a housing space 116 with a specific width is formed between the case portion 102 and the seat width direction outer side frame 26. The airbag module 108 of the side airbag device 100 is housed inside the housing space 116. As illustrated in FIG. 3, in an assembled state the side wall portion 102B of the case portion 102 is disposed at a seat width direction outer side face of the folded side airbag 106 of the airbag module 108. Note that the pad side portion 66 of the seatback pad 18 is disposed still further to the outside than the side wall portion 102B of the case portion 102. A power cloth 120 is provided to the outside of the case portion 102. An inside end portion 120A of the power cloth 120 is fixed to the rear wall portion 26C of the side frame 26. An outside end portion 120B of the power cloth 120 passes to the seat width direction outer side of the side wall portion 102B of the case portion 102 and the seatback pad 18 and is sewn to a front end side terminal portion of the cover side portion 78.

In the vehicle seat 10 employing the case portion 102, the case portion 102 itself also takes on the role of a metal module case traditionally employed for housing the airbag module 108. A metal module case is therefore not employed in the present exemplary embodiment.

Operation and Advantageous Effects of the Present Exemplary Embodiment Explanation follows regarding operation and advantageous effects of the present exemplary embodiment.

In the vehicle seat 10 configured as described above, the side airbag device 100 is attached to the seat width direction outer side frame 26 at a specific position prior to assembly of the seat back board 16 to the seatback frame 14. Specifically, the side airbag device 100 is fixed to the side frame 26 by inserting the stud bolts 110 projecting out from the diffuser 105 of the airbag module 108 through the bolt insertion holes formed in the side frame 26 and screwing on the nuts 114.

Next, the seat back board 16 is assembled to the seatback frame 14 from the seat rear side. Specifically, the left and right fixing portions 50 are disposed at the outsides of the left and right side frames 26, and the resin clips, not illustrated in the drawings, are inserted into the attachment holes 32 of the side frames 26. The seat back board 16 is thereby fixed to the side frames 26 of the seatback frame 14. The side airbag device 100 is housed inside the case portion 102 of the seat back board 16 when this is performed. The side wall portion 102B of the case portion 102 is thus disposed in a state contacting the seat width direction outer side face of the airbag module 108. Next, the seatback pad 18 is covered from the seat front side, with the cover 20 being laid over the front face of the seatback pad 18. Note that since the outside end portion 120B of the power cloth 120 is stitched in advance to the cover side portion 72, the inside end portion 120A of the power cloth 120 is fixed to the rear wall portion 26C of the side frame 26 when laying the cover 20.

The thus assembled seatback 12 is rotatably attached to the rear end portion of the seat cushion 11 to configure the vehicle seat 10. A load towards the seat rear side acts on the back spring section 38 through the cover 20 and the seatback pad 18 when an occupant sits on the vehicle seat 10. The lower side back spring body portions 48 and the upper side back spring body portion 54 thereby undergo flexing deformation towards the seatback rear side that is the load application direction. This load is transmitted from the fixing portions 50 to the left and right side frames 26, generating a reaction force from the side frames 26 towards the seat front side.

Load input to the back spring section 38 from the occupant contributes towards securing cushioning properties of the seatback 12 due to the back spring section 38 white meat undergoing flexing deformation, with the load itself being transmitted to the left and right side frames 26 and supported by the left and right side frames 26. As a result, sufficient cushioning properties can be secured for the seatback 12. Moreover, due to integrally providing the resin back spring section 38 to the back board portion 36, the number of components and the number of assembly processes can be reduced compared to when the back spring section 38 is configured by a metal seatback spring. As a result, according to the present exemplary embodiment, cushioning properties of the seatback 12 can be secured, and a reduction in weight and reduction in costs can also be achieved.

Figure 6:
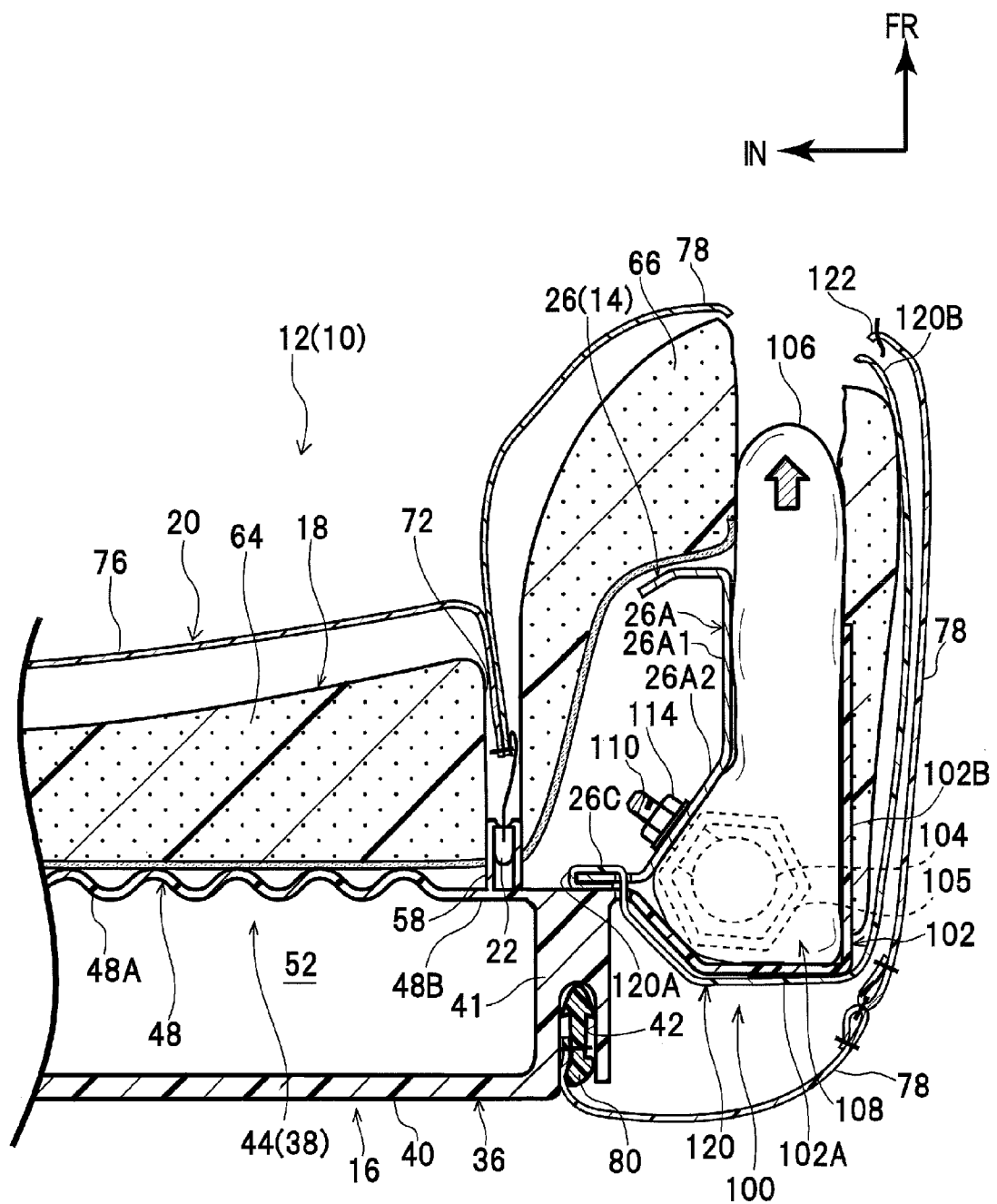
FIG. 6 is an enlarged plan view cross-section corresponding to FIG. 3, illustrating a state immediately after actuation of the side airbag device.

The inflator 104 of the side airbag device 100 actuates in the event that the vehicle applied with the thus assembled vehicle seat 10 is involved in a side-on collision or a roll-over. Gas is expelled from the gas ejection portion 104A at the lower end portion of the inflator 104, the gas flowing into the side airbag 106 that is in a folded state after the flow has been regulated by the diffuser 105. As illustrated in FIG. 6, the side airbag 106 thus begins to inflate, breaking the pad side portion 66, and exerting a concentrated pulling force on a cover splitting portion 122 of the cover side portion 78 through the power cloth 120 as this occurs. The cover splitting portion 122 splits open as a result, and the side airbag 106 inflates and deploys towards the seat front side. Note that in the present exemplary embodiment, due to providing the partitioning wall 112 inside the side airbag 106, inflation of the smaller capacity lower chamber 106A completes before inflation of the larger capacity upper chamber 106B completes, thus promptly restraining the waist of the seated occupant. Next, inflation of the upper chamber 106B completes, thus restraining the chest of the seated occupant. The lower chamber 106A has a higher internal bag pressure than that of the upper chamber 106B.

Normally, during inflation and deployment of the side airbag 106 towards the seat front side, the side airbag 106 would inflate towards the seat front side only after expanding in a ball shape so as to push the outside portion 66A (see FIG. 6) of the pad side portion 66 of the seatback pad 18 out towards the seat width direction outer side by the amount by which the side airbag 106 is unable to expand towards the side frame 26 side.

However, in the present exemplary embodiment the case portion 102 is integrally formed to the seat back board 16, and the side wall portion 102B of the case portion 102 is disposed further towards the inside than the outside portion 66A of the pad side portion 66. The side airbag 106 is therefore restricted from expanding towards the seat width direction outer side by the rigidity of the side wall portion 102B. The side airbag 106 is thereby effectively suppressed from expanding in a ball shape whilst crushing the outside portion 66A of the pad side portion 66. The side airbag 106 is thereby swiftly inflated and deployed towards the seat front side in the event of a side-on collision in the present exemplary embodiment.

An increase in the number of components and more complex assembly processes are moreover avoided due to integrally providing the side wall portion 102B of the case portion 102 to the seat back board 16.

The present exemplary embodiment thereby enables initial occupant restraint performance of the side airbag 106 to be enhanced, and also enables a reduction in costs to be achieved.

In the present exemplary embodiment, the side wall portion 102B of the case portion 102 doubles as an airbag case, thereby enabling a separately formed metal airbag case to be omitted. The present exemplary embodiment accordingly enables a reduction in the number of components, and therefore a reduction in costs, compared to when a separate metal airbag case is provided.

In the present exemplary embodiment, the side airbag device 100 is fixed at the seat width direction outer side of the side frame 26. Once this operation has been completed, the seat back board 16 is assembled to the seatback frame 26 from the rear side and fixed to the pair of left and right side frames 26 so as to cover the side airbag device 100 from the seat rear side. The side airbag device 100 can therefore be installed without modifying an existing assembly sequence of a vehicle seat provided with a seat back board.

Second Exemplary Embodiment

Figure 8:
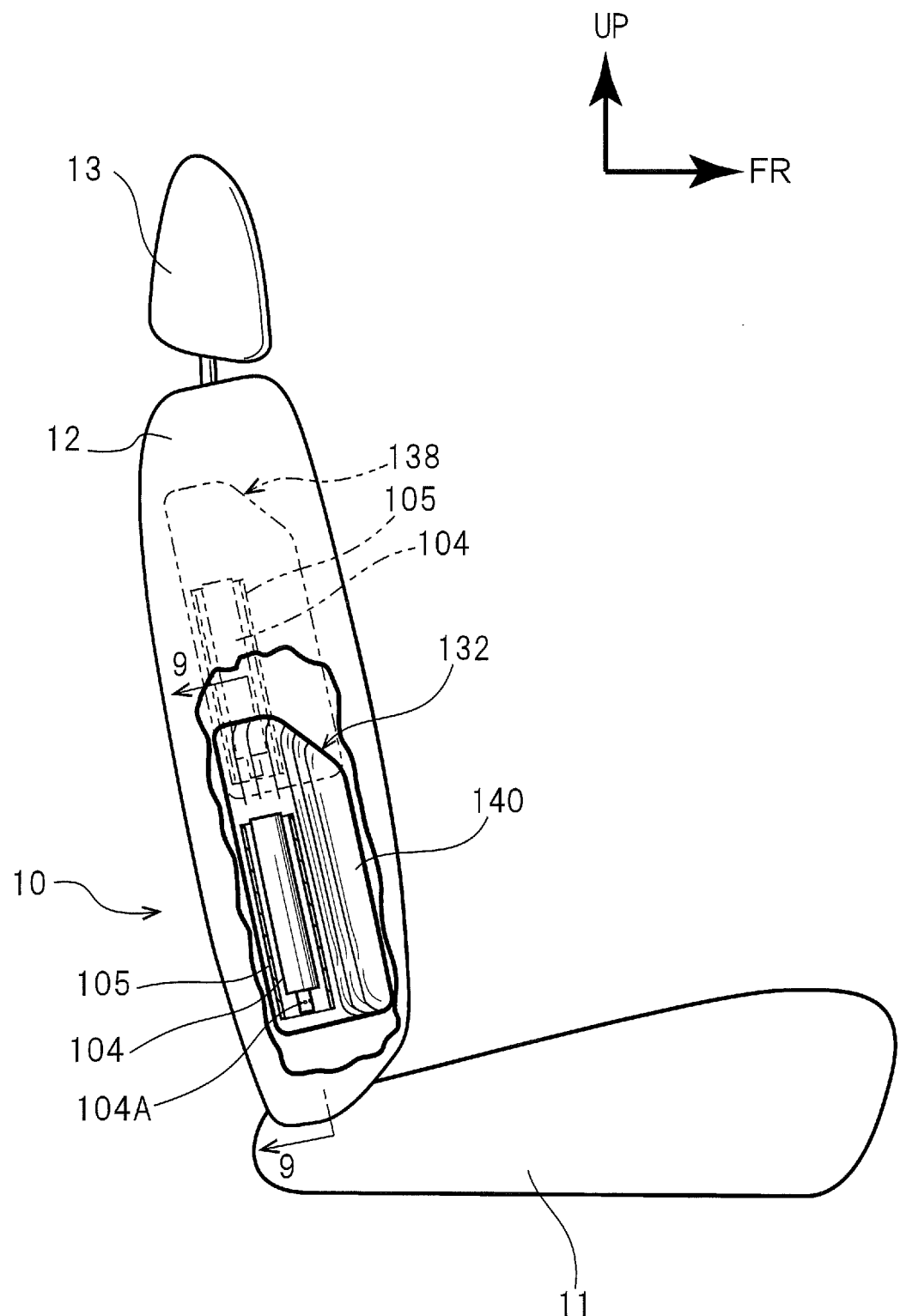
FIG. 8 is a partially cut-away side view corresponding to FIG. 7, illustrating a vehicle seat provided with a side airbag device according to a second exemplary embodiment.
Figure 9:
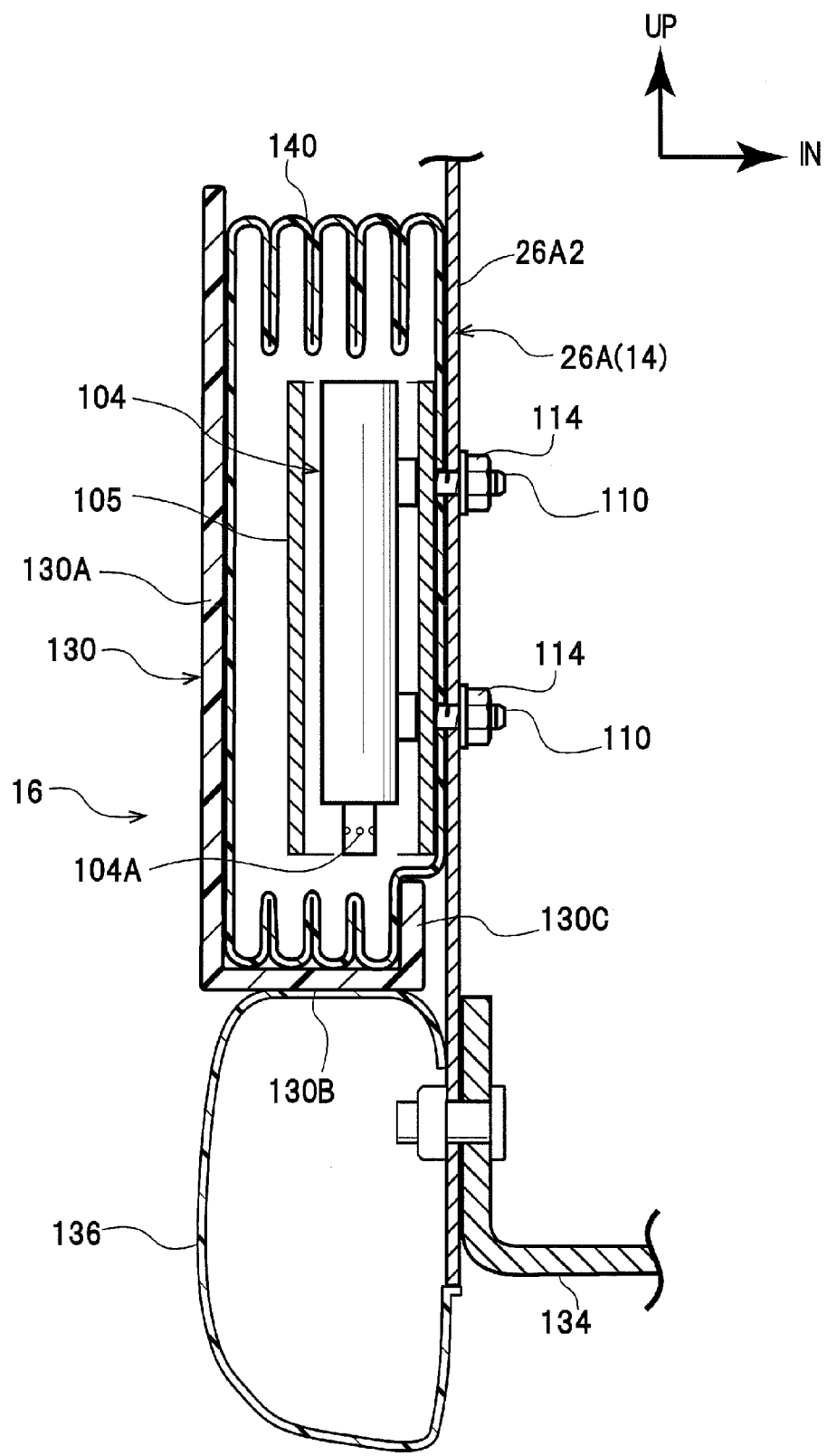
FIG. 9 is an enlarged vertical cross-section illustrating a cut-away state taken along line 9-9 in FIG. 8.

Explanation follows regarding a second exemplary embodiment of a vehicle seat provided with a side airbag device according to the present invention, with reference to FIG. 8 and FIG. 9. Note that configuration portions similar to those of the first exemplary embodiment are allocated the same reference numerals and explanation thereof is omitted.

As illustrated in FIG. 8 and FIG. 9, in the second exemplary embodiment a case portion 130 is not only provided with the side wall portion 130A that serves as an upright wall portion, but also with a bottom wall portion 130B. As illustrated in FIG. 9, the bottom wall portion 130B extends from a lower end portion of the side wall portion 130A at a right angle towards the seat width direction inner side. A leading end portion 130C of the bottom wall portion 130B is bent around towards the seat upper side. Although not illustrated in the drawings, the case portion 130 is provided with a rear wall portion and a top wall portion similarly to the case portion 102 described in the first exemplary embodiment. The case portion 130 is thus formed in a thin box shape that is open towards the seat front side and the seat width direction inner side. In an assembled state of a side airbag device 132, the seat width direction inner side opening of the case portion 130 is closed off by the rear portion 26A2 of the side wall portion 26A of the side frame 26. The case portion 130 of the present exemplary embodiment is integrally formed to a seat width direction outer side portion of the seat back board 16, similarly to in the first exemplary embodiment.

As illustrated in FIG. 8, by adopting the configuration described above the side airbag device 132 of the present exemplary embodiment is disposed further towards the seat lower side than the side airbag device 100 described in the first exemplary embodiment, namely is disposed in a range from a height direction intermediate portion to a lower end portion of the seat width direction outer side portion of the seatback 12. More specifically, the bottom wall portion 130B of the case portion 130 is disposed in a state abutting or adjacent to an upper face of a resin seat side shield 136 that is disposed extending towards the seat width direction outer side of a seat pan 134. Note that the double-dotted intermittent lines in FIG. 8 illustrate a normal placement position for a side airbag device 138.

Operation and Advantageous Effects

The configuration described above builds on the configuration of the first exemplary embodiment described above, and therefore obtains similar operation and advantageous effects.

Moreover, due to providing the case portion 130 with the bottom wall portion 130B in the present exemplary embodiment, the side wall portion 130A is reinforced by the bottom wall portion 130B. The resistance of the side wall portion 130A to deformation is therefore increased when pressure is exerted on the side wall portion 130A during deployment of a side airbag 140. The side airbag 140 can thereby be even more effectively suppressed from expanding towards the seat width direction outer side during side airbag 140 deployment. As a result, the present exemplary embodiment enables the side airbag 140 to be deployed between door trim and the side of the seated occupant even more swiftly in the event of a side-on collision.

In the present exemplary embodiment, the bottom wall portion 130B is provided at the lower end portion of the side wall portion 130A as described above, such that the side airbag 140 does not expand downwards below the bottom wall portion 130B during side airbag 140 deployment. Since a portion of the deploying side airbag 140 is prevented from entering a space (see FIG. 7) of height h that is situated below the folded side airbag 140 in the first exemplary embodiment, thus delaying deployment of the side airbag 140, there is no need to use the pad side portion 66 to fill up such a space. As a result, it is possible for the entire side airbag device 132 to be disposed in the range from the height direction intermediate portion to the lower end portion of the pad side portion 66 of the seatback 12. Installing the side airbag device 132 within this range reduces the distance between the gas ejection portion 104A of the inflator 104 and the waist of the seated occupant compared to when the side airbag device 138 is installed to the seat upper side of this range (see the double-dotted intermittent line in FIG. 8).

Moreover, in the present exemplary embodiment the inside of the side airbag 140 is partitioned by a partitioning wall into a lower chamber that restrains the waist of the seated occupant and an upper chamber that restrains the chest of the seated occupant similarly to in the first exemplary embodiment, however disposing the lower chamber facing the gas ejection portion 104A of the inflator 104 along the seat front-rear direction enables the lower chamber to be inflated and deployed even more swiftly.

As a result, the present exemplary embodiment enables a further increase in the initial restraint performance with respect to the waist of the seated occupant, and also enables greater degrees of freedom in the layout of the side airbag device 132 with respect to the seatback 12 in the sense that a lower placement of the side airbag device 132 is possible.

Third Exemplary Embodiment

Figure 10:
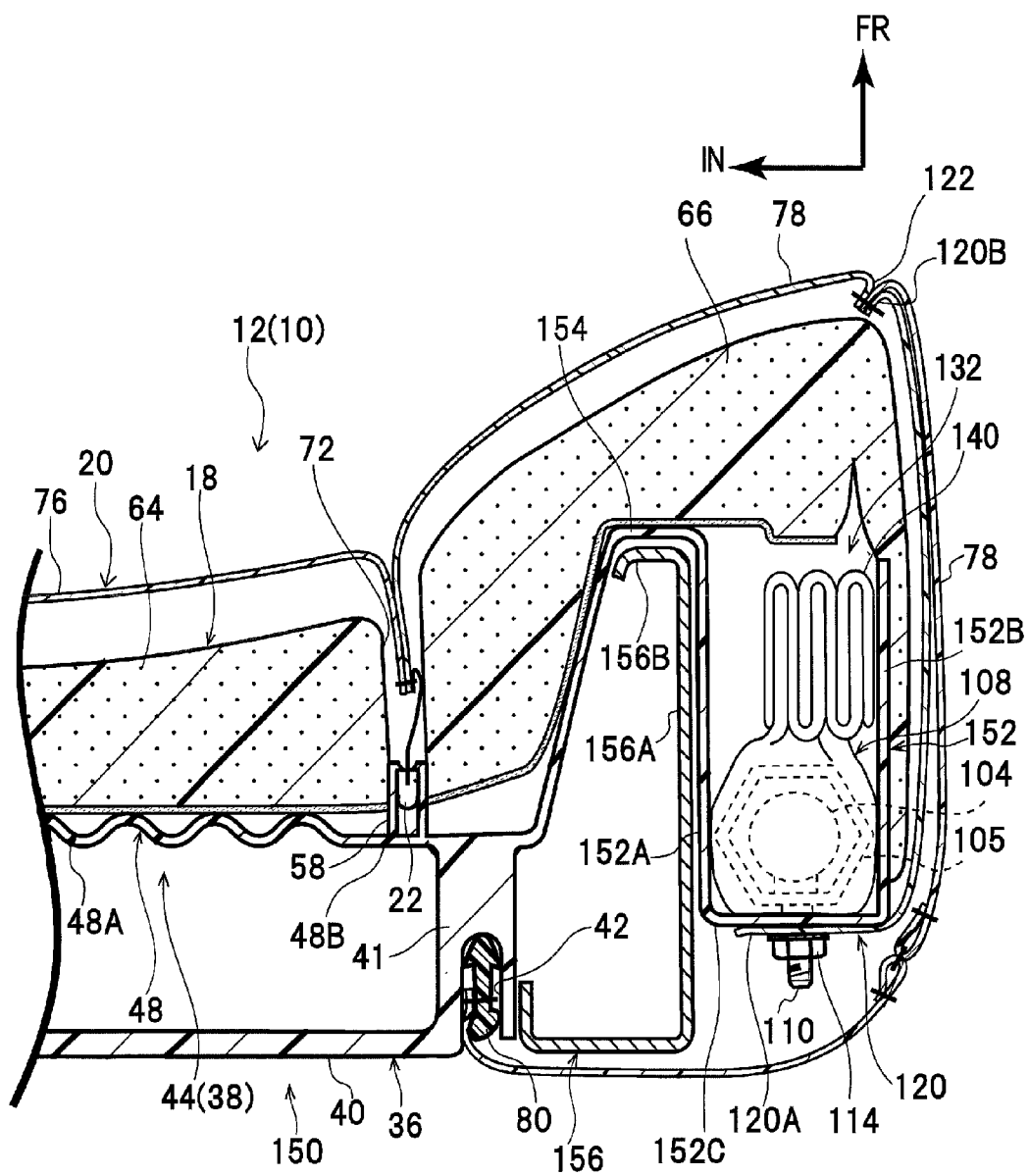
FIG. 10 is an enlarged plan view cross-section corresponding to FIG. 3, illustrating a vehicle seat provided with a side airbag device according to a third exemplary embodiment.

Explanation follows regarding a second exemplary embodiment of a vehicle seat provided with a side airbag device according to the present invention, with reference to FIG. 10. Note that configuration portions similar to those of the first and second exemplary embodiments described above are allocated the same reference numerals and explanation thereof is omitted.

As illustrated in FIG. 10, in the third exemplary embodiment a case portion 152 that houses the side airbag device 132 is integrally provided to a structure in which a seat back board 150 is fitted and fixed to the pair of left and right side frames 26 from the seat front side.

Specifically, U-shaped fixing portions 154 that are open towards the seat rear side in plan view cross-section are respectively integrally formed to both side portions of the seat back board 150. The fixing portions 154 are fitted together with front wall portions 156B of side frames 156 from the seat front side, and are fixed to side wall portions 156A. The case portion 152 is integrally formed to the seat width direction outer side fixing portion 154 out of the left and right fixing portions 154, with a U-shaped plan view cross-section profile that is open towards the seat front side. The case portion 152 is configured including a pair of left and right side wall portions 152A, 152B, and a rear wall portion 152C that connects together rear end portions of the side wall portions 152A, 152B along the seat width direction. Of these wall portions, the side wall portion 152B corresponds to the upright wall portion of the present invention. Note that the case portion 152 is preferably provided with at least one of the top wall portion 102C explained in the first exemplary embodiment or the bottom wall portion 130B explained in the second exemplary embodiment, however neither are strictly necessary. In order to increase the rigidity of the side wall portion 152B in such cases, for example a rib may be formed at a joint portion between the side wall portion 152B and the rear wall portion 152C, or the plate thickness of the side wall portion 152B may be increased.

Operation and Advantageous Effects

The configuration described above builds on the configuration of the first exemplary embodiment described above, and therefore obtains similar operation and advantageous effects.

Moreover, in the present exemplary embodiment the U-shaped case portion 152 that is open towards the seat front side in plan view cross-section is provided to the seat width direction outer side end portion of the seat back board 150, and the side airbag device 132 is assembled to the case portion 152 in advance. The seat back board 150 is then fitted to the seatback frame 14 from the seat front side, and the seat back board 150 is fixed to the pair of left and right side frames 26.

A reaction force acts towards the seat rear side (namely in the direction in which the seat back board 150 fits together most strongly with the side frames 26) during inflation and deployment of the side airbag 140 towards the seat front side. In the present exemplary embodiment, the seat back board 150 can be prevented from coming away from the side frames 26 during deployment of the side airbag 140 as a result.

Supplementary Explanation of the Exemplary Embodiments

In the exemplary embodiments described above, for example in the first exemplary embodiment, the resin back board portion 36 and the resin back spring section 38 are formed integrally to one another, however there is no limitation thereto and a resin back spring portion may be provided integrally to a resin back board portion. Namely, a back board portion and a back spring section may be manufactured separately to one another and then integrated together for example by welding. A back spring body portion and fixing portions that configure a back spring section may also be manufactured as separate components and then integrated together for example by welding. To elaborate further, in the above exemplary embodiments, for example in the first exemplary embodiment, explanation has been given wherein the fixing portions 50 are configuration elements on the back spring section 38 side, however the fixing portions 50 may also be regarded as back board portion 36 side configuration elements. This is due to the fact that in the completed state of the seat back board, the issue of whether the configuration element of the fixing portions are included on the back spring section side or included on the back board portion side is merely one of classification.

In the exemplary embodiments described above, for example in the first exemplary embodiment, the case portion 102 is integrally formed to the seat back board 16, however there is no limitation thereto and the case portion may be formed separately to the seat back board and then integrated thereto for example by thermal welding. This point also applies to the second exemplary embodiment and the third exemplary embodiment.

It is sufficient for the side wall portion 102B of the case portion 102 (first exemplary embodiment), the side wall portion 130A of the case portion 130 (second exemplary embodiment), and the side wall portion 152B of the case portion 152 (third exemplary embodiment), that respectively correspond to the upright wall portion of the present invention, to extend along the seat front-rear direction and the seat up-down direction at a seat width direction outer side face of the side airbag 106, 140 when in a folded state, and to restrict expansion of the side airbag 106, 140 towards the seat width direction outer side during inflation and deployment. There is therefore no requirement for the entire folded state side airbag to be covered by the side wall portion (upright wall portion) of the case portion in side view of the seat (vehicle). The invention according to claim 1 is a configuration provided with the upright wall portion that extends in the seat front-rear direction and in the seat up-down direction along a seat width direction outer side face of the side airbag and that restricts expansion of the side airbag towards the seat width direction outer side, however the portion corresponding to the upright wall portion need not configure an airbag case.

The invention claimed is:

1. A vehicle seat provided with a side airbag device, comprising:
 a seatback frame that is provided with a pair of left and right side frames and that configures a seatback framework member;
 a side airbag device that is installed at a seat width direction outer side of one of the side frames disposed facing a vehicle body side portion, and that inflates and deploys a side airbag towards a seat front side in the event of a side-on collision;
 a seat back board made from resin, that is disposed at a seatback back face side and that is fixed to the pair of left and right side frames;
 a seatback pad that is disposed at a front face side of the seat back board, with a seat width direction outer side portion of the seatback pad disposed at a seat width direction outer side of the side airbag device; and
 an upright wall portion that is integral to, or is integrally provided to, a seat width direction outer side portion of the seat back board, and that extends in a seat front-rear direction and a seat up-down direction along a seat width direction outer side face of the side airbag that is in a folded state inside a side portion of the seatback pad, the upright wall portion restricting expansion of the side airbag towards a seat width direction outer side; and
 wherein
 the upright wall portion is integrally formed to the seat back board, and doubles as an airbag case that at least houses the side airbag in a folded state, and a bottom wall portion that is integrally formed to the seat back board and that extends in a direction intersecting with the upright wall portion is connected to a lower end portion of the upright wall portion.

2. The vehicle seat provided with a side airbag device of claim 1, wherein:

the side airbag device is fixed at a seat width direction outer side of the side frame; and the seat back board is assembled from a seatback frame rear side so as to cover the side airbag device from the seatback frame rear side, and is fixed to the pair of left and right side frames.

3. The vehicle seat provided with a side airbag device of claim 1, wherein:

the seat back board is fitted together with the seatback frame from a seat front side and fixed to the pair of left and right side frames, and a case portion configured with a U-shape open towards a seat front side in plan view cross-section is provided at a seat width direction outer side end portion of the seat back board; and the side airbag device is fixed to a rear wall portion of the case.

4. The vehicle seat provided with a side airbag device of claim 1, wherein:

the side airbag device is configured including an inflator that is formed with a circular cylinder shape and that is provided with a gas ejection portion at a lower end portion thereof, the gas ejection portion supplying gas into the side airbag that is in a folded state; and the side airbag device is installed in a range from a height direction intermediate portion to a lower end portion of a seat width direction outer side portion of a seatback.

5. The vehicle seat provided with a side airbag device of claim 1, wherein:

an inside of the side airbag is provided with a partitioning wall, thereby partitioning the side airbag into a lower chamber that is disposed facing a gas ejection portion along the seat front-rear direction and that is configured to restrain a waist of a seated occupant, and an upper chamber that is configured to restrain a chest of the seated occupant.

* * * * *